(12) United States Patent
Trim et al.

(10) Patent No.: US 10,834,079 B2
(45) Date of Patent: Nov. 10, 2020

(54) NEGOTIATIVE CONVERSATION CHAT BOT

(71) Applicant: INTERNATIONAL BUSINESS MACHINES CORPORATION, Armonk, NY (US)

(72) Inventors: Craig M. Trim, Ventura, CA (US); Aaron Baughman, Silver Spring, MD (US); Gandhi Sivakumar, Bentleigh (AU); Sreekanth Ramakrishna Iyer, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/202,424

(22) Filed: Nov. 28, 2018

(65) Prior Publication Data
US 2020/0169554 A1    May 28, 2020

(51) Int. Cl.
*H04L 29/06* (2006.01)
*H04L 12/58* (2006.01)

(52) U.S. Cl.
CPC .......... *H04L 63/0876* (2013.01); *H04L 51/02* (2013.01); *H04L 51/12* (2013.01)

(58) Field of Classification Search
CPC .......... G06F 21/31; G06F 21/50; G06F 21/52; G06F 21/53; G06F 21/55; H04L 63/08; H04L 63/0876; H04L 51/02; H04L 51/12; H04L 63/14; H04L 63/1408; H04L 63/1416; H04L 63/1425
See application file for complete search history.

(56) References Cited

U.S. PATENT DOCUMENTS 9,794,276 B2   10/2017  Call et al.
9,832,646 B2   11/2017  Richards et al.
10,015,178 B2   7/2018  Schulman et al.
(Continued)

OTHER PUBLICATIONS

Rafique et al., Exploring Static and Live Digital Forensics: Methods, Practices and Tools, International Journal of Scientific & Engineering Research, 2013, entire document, vol. 4, Issue 10, http://www.ijser.org/researchpaper%5CExploring-Static-and-Live-Digital-Forensic-Methods-Practicesand-Tools.pdf, entire document.

(Continued)

*Primary Examiner* — Malcolm Cribbs
(74) *Attorney, Agent, or Firm* — Patrick J. Daugherty; Daugherty & Del Zoppo Co., LPA

(57) ABSTRACT

Aspects of the present invention provide a negotiative chat bot that executes a back-end security process to resolve a status of a suspicious input as safe or unsafe; creates conversational chat bot messages that request content subject matter in response that are different from content of the suspicious request or chat bot message responses from the identified user; and generate and present conversational chat bot messages that present created conversational chat bot message content in a style that matches a preferred conversational style of the identified user. Aspects iteratively repeating presenting conversational chat bot messages requesting subject matter content different from subsequent conversational chat bot message responses in the style that matches the preferred conversational style, until determining that the suspicious input status is resolved.

20 Claims, 4 Drawing Sheets

(56) References Cited

U.S. PATENT DOCUMENTS

| | | | |
|---|---|---|---|
| 10,419,934 B1* | 9/2019 | Sapunaru | H04L 51/18 |
| 2003/0004898 A1* | 1/2003 | McAuliffe | G06Q 30/02 |
| | | | 705/80 |
| 2006/0069546 A1* | 3/2006 | Rosser | G10L 13/00 |
| | | | 704/9 |
| 2008/0141031 A1* | 6/2008 | Oba | H04L 63/205 |
| | | | 713/170 |
| 2012/0130728 A1* | 5/2012 | Friedlander | G06Q 50/22 |
| | | | 705/2 |
| 2017/0337557 A1 | 11/2017 | Durney | |
| 2017/0358296 A1* | 12/2017 | Segalis | H04M 3/58 |
| 2018/0293483 A1* | 10/2018 | Abramson | G06N 3/006 |
| 2018/0317086 A1* | 11/2018 | Ben Henda | H04W 12/0602 |
| 2019/0058793 A1* | 2/2019 | Konig | H04M 3/5175 |
| 2020/0065523 A1* | 2/2020 | Fukuda | H04L 51/12 |
| 2020/0073982 A1* | 3/2020 | Kolluri Venkata Sesha | |
| | | | G06F 16/248 |

OTHER PUBLICATIONS

Unix & Linus Stack Exchange, Why is there a big delay after entering a wrong password, 2010, entire document, https://unix.stackexchange.com/questions/2126/why-is-there-a-big-delay-after-entering-a-wrong-password, entire document.
Peter Mell et al, The NIST Definition of Cloud Computing, National Institute of Standards and Technology, Publication 800-145, 2011, entire document.

* cited by examiner

NEGOTIATIVE CONVERSATION CHAT BOT

TECHNICAL FIELD

The present invention relates generally to a method, system, and computer program product for an automated assistant interface. More particularly, the present invention relates to a method, system, and computer program product for chat bot interface.

BACKGROUND

"Big data" refers to data sets that are too large or complex for traditional data-processing applications. Data with many cases (rows) offer greater statistical power, while data with higher complexity (more attributes or columns) may lead to a higher false discovery rate. Big data challenges include capturing data, data storage, data analysis, search, sharing, transfer, visualization, querying, updating, information privacy and data source. Big data is often defined or associated with respect to key concepts, for example, volume, variety, and velocity, veracity (an amount of noise in the data) and value.

Machine learning is a field of artificial intelligence that uses statistical techniques to give computer systems the ability to "learn" or progressively improve performance on a specific task) from data, without being explicitly programmed. Machine learning explores the study and construction of algorithms that can learn from and make predictions on data. Such algorithms overcome following strictly static program instructions by making data-driven predictions or decisions, through building a model from sample inputs. Machine learning is employed in a range of computing tasks where designing and programming explicit algorithms with good performance is difficult or infeasible; example applications include email filtering, detection of network intruders, and computer vision.

Cognitive Models enabled by Big Data and Machine Learning platforms may define "Cognitive Entities" ("CE") that are designed to remember the past, interact with humans and develop human-like capability to continuously learn, and refine responses for the future with increasing levels of prediction.

BRIEF SUMMARY

In one aspect of the present invention, a computer-implemented method includes, in response to determining that an input from an identified user is suspicious, executing a back-end security process to resolve a status of the suspicious input as safe or unsafe; creating conversational chat bot message content that requests content subject matter in response that is different from content of the suspicious request; generating a conversational chat bot message that presents the created conversational chat bot message content in a style that matches a preferred conversational style of the identified user; presenting the generated conversational chat bot message to the identified user; and, until determining that the status of the suspicious input is resolved, in response to each subsequent conversational chat bot message response from the identified user to a generated conversational chat bot message presented to the identified user, iteratively repeating creating, generating and presenting conversational chat bot messages comprising requests for content subject matter in response that are different from each subsequent conversational chat bot message response and in the style that matches the preferred conversational style the identified user.

In another aspect, a computer system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby, in response to determining that an input from an identified user is suspicious, executes a back-end security process to resolve a status of the suspicious input as safe or unsafe; creating conversational chat bot message content that requests content subject matter in response that is different from content of the suspicious request; generates a conversational chat bot message that presents the created conversational chat bot message content in a style that matches a preferred conversational style of the identified user; presents the generated conversational chat bot message to the identified user; and, until determining that the status of the suspicious input is resolved, in response to each subsequent conversational chat bot message response from the identified user to a generated conversational chat bot message presented to the identified user, iteratively repeats creating, generating and presenting conversational chat bot messages comprising requests for content subject matter in response that are different from each subsequent conversational chat bot message response and in the style that matches the preferred conversational style the identified user.

In another aspect, a computer program product has a computer-readable storage medium with computer readable program code embodied therewith. The computer readable program code includes instructions for execution by a computer processor that cause the computer processor to, in response to determining that an input from an identified user is suspicious, execute a back-end security process to resolve a status of the suspicious input as safe or unsafe; creating conversational chat bot message content that requests content subject matter in response that is different from content of the suspicious request; generate a conversational chat bot message that presents the created conversational chat bot message content in a style that matches a preferred conversational style of the identified user; present the generated conversational chat bot message to the identified user; and, until determining that the status of the suspicious input is resolved, in response to each subsequent conversational chat bot message response from the identified user to a generated conversational chat bot message presented to the identified user, iteratively repeat creating, generating and presenting conversational chat bot messages comprising requests for content subject matter in response that are different from each subsequent conversational chat bot message response and in the style that matches the preferred conversational style the identified user.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
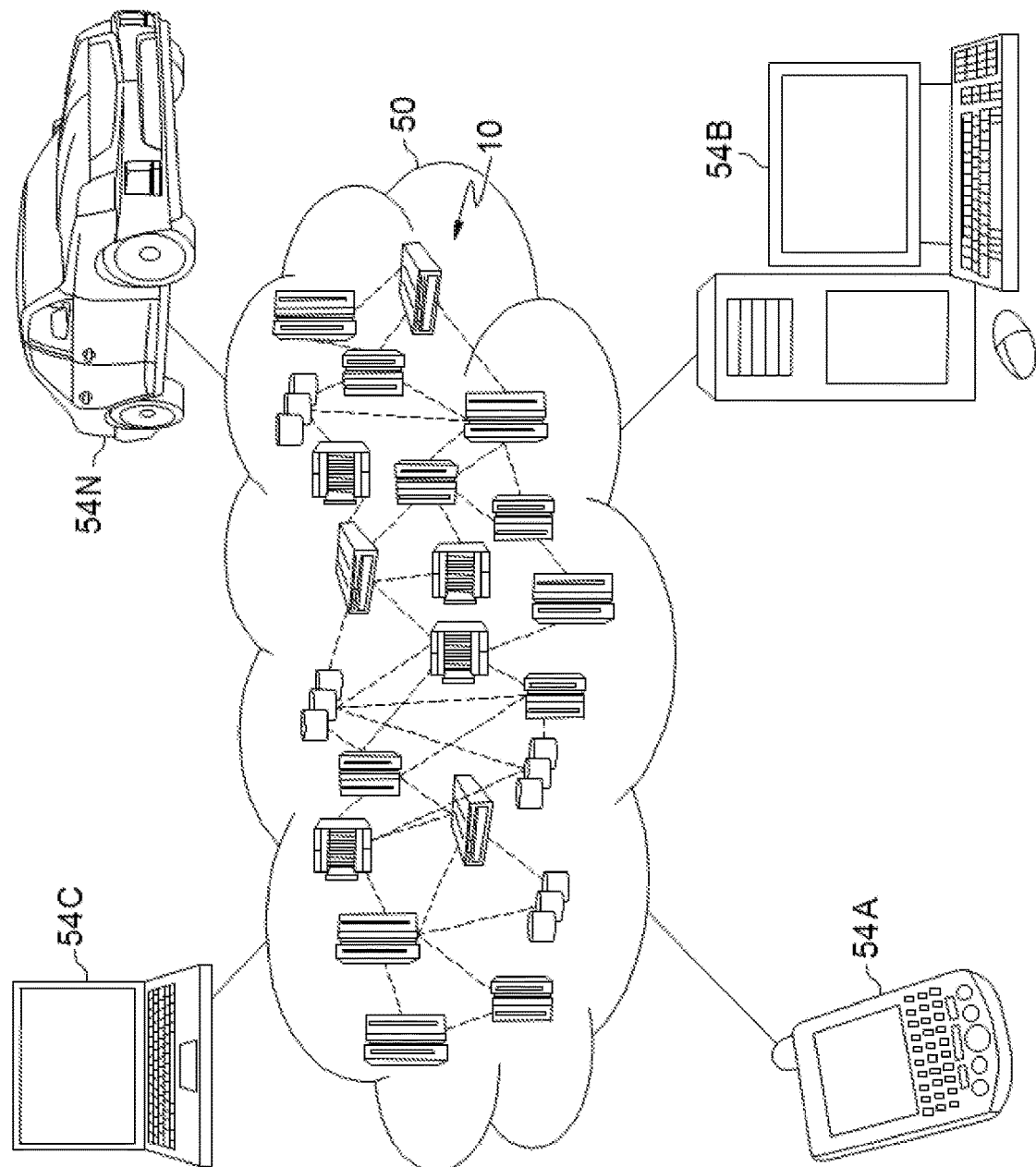
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
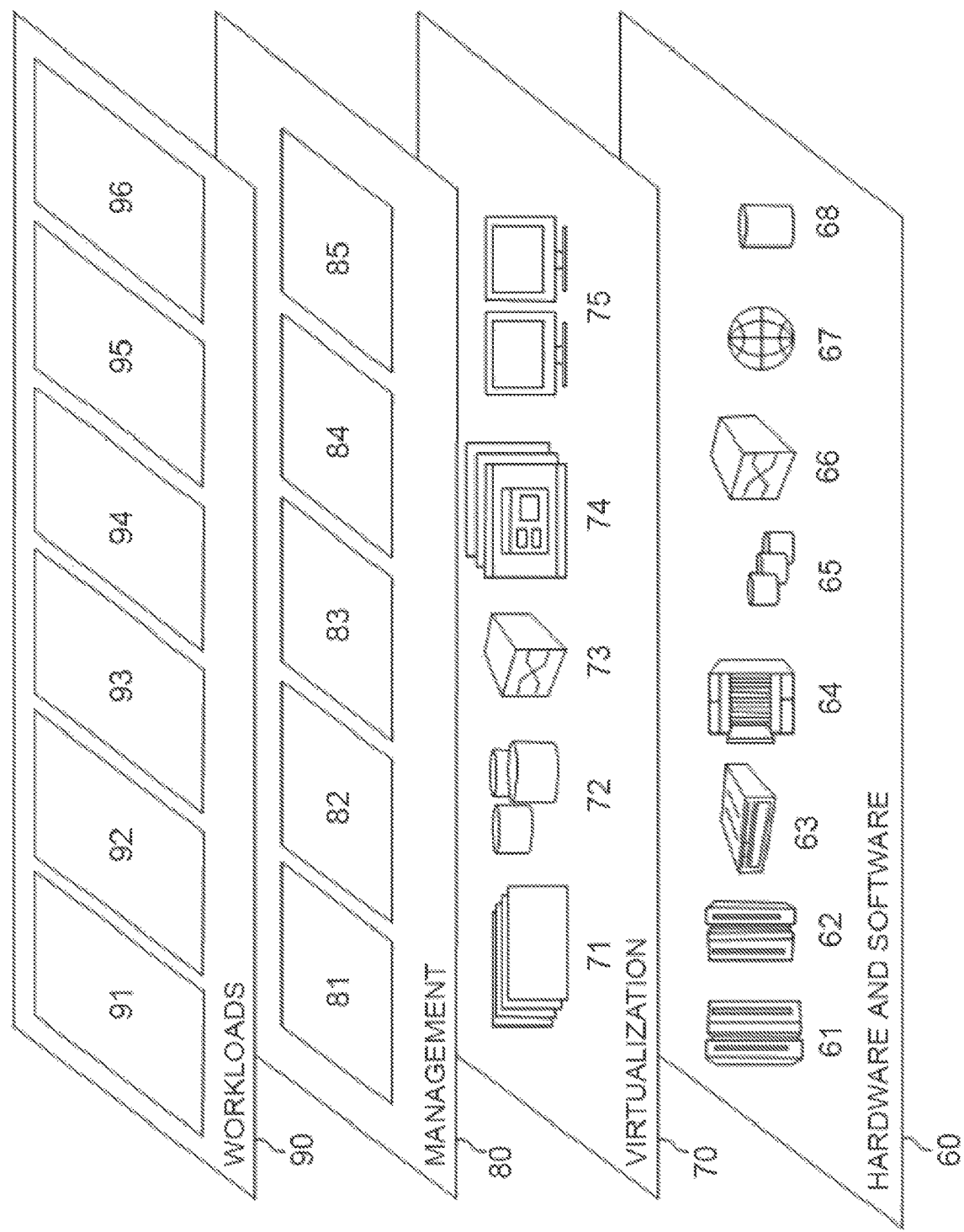
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a negotiative chat bot according to aspects of the present invention 96.

Figure 3:
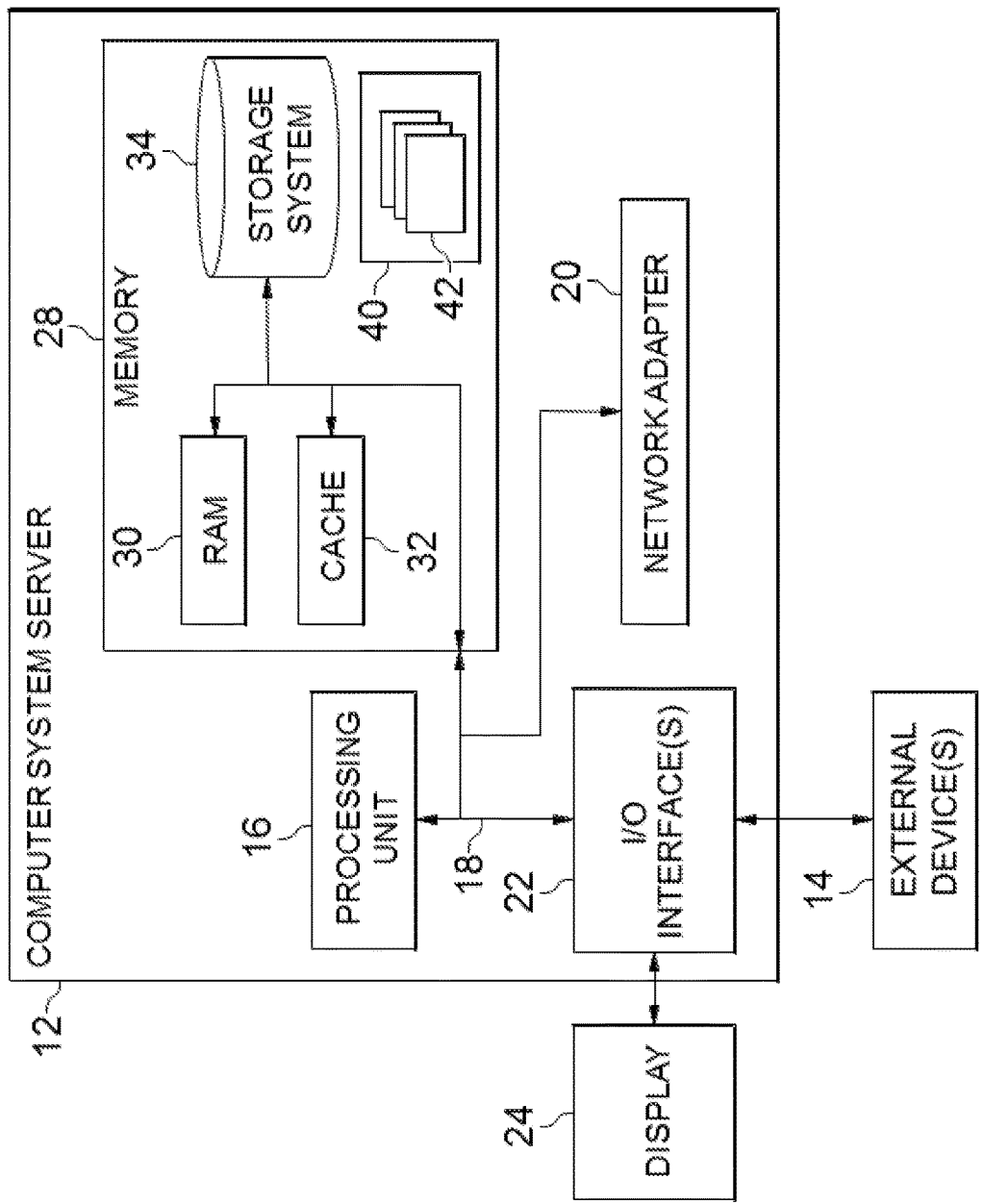
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
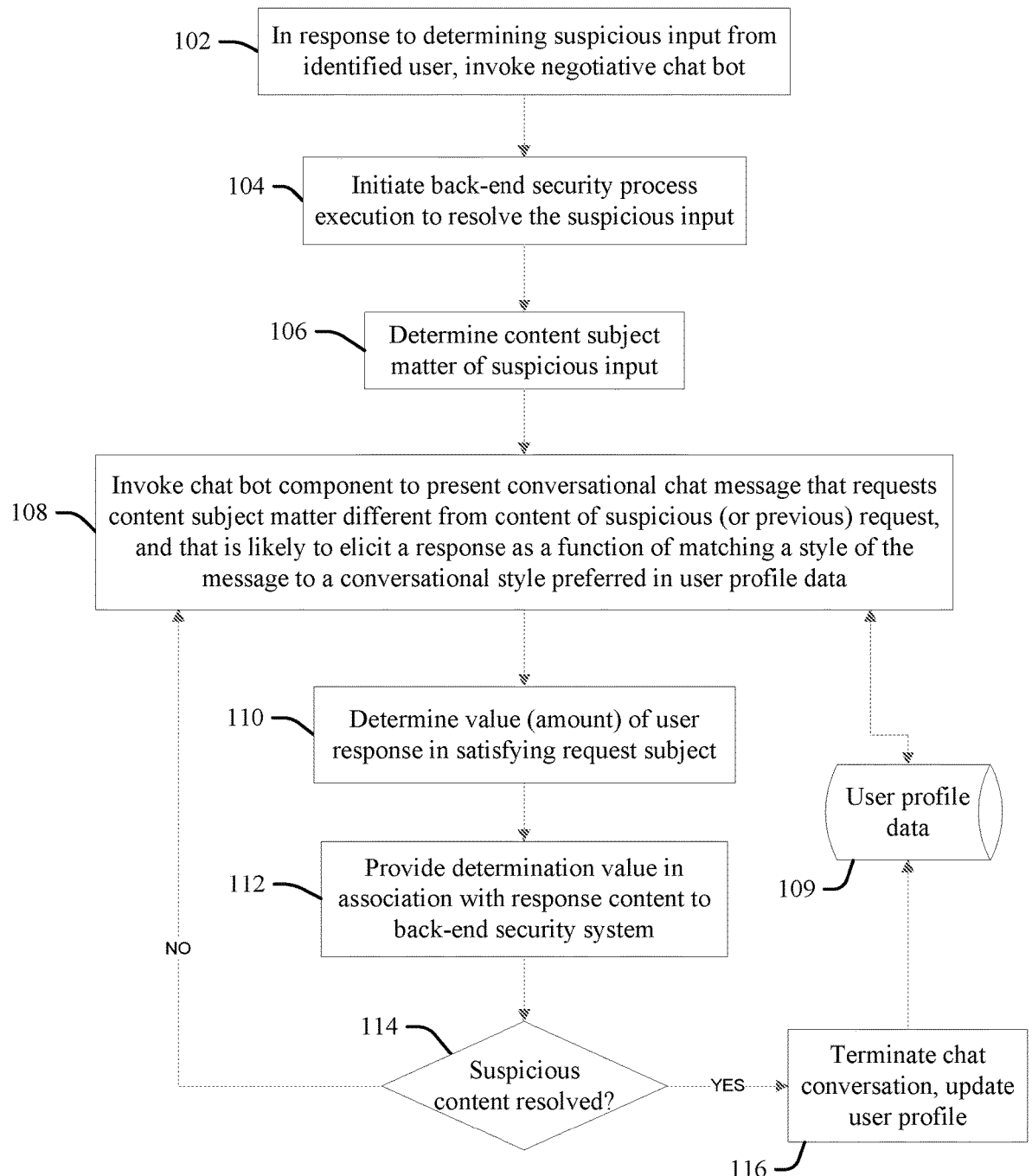
FIG. 4 is a block diagram illustration of an embodiment of the present invention.

FIG. 4 illustrates a system, process, or device according to an embodiment of the present invention. In response to determining that an input from an identified user is suspicious, at 102 a processor that is configured according to the present invention (the "configured processor") invokes a negotiative chat bot application, component or mechanism according to the present invention.

A "negotiative chat bot" refers to a chat bot component or structure that is configured to extend a time period required for processing content of the suspicious input to enable back-end security processes to execute additional security processes to resolve the suspicious input as verified and non-suspicious, or to confirm a possible security breach represented by the suspicious input and terminate access to secure data by the identified user (until further security processes clear and reestablish security credentials for the identified user).

Thus, at 104 the configured processor initiates (instructs) a back-end security system to execute a security process to resolve the suspicious input as verified (safe) or non-verified (unsafe, or a security breach).

At 106 the configured processor determines a content subject matter of the suspicious input. Illustrative but not exhaustive examples of suspicious inputs include frequent transactions from the same user that are made in frequent, short periods of time, and associated with large deposits and withdrawals made in cash or by check in the case of financial accounts; numerous transactions that are initiated from different locations on the same day for the same account, particular for banking transactions below an established reporting threshold; inconsistent device usage, such as a log-in that is not from the usual or historic smart phone, personal computer or internet protocol addresses; and still other examples will be appreciated by one skilled in the art. In response to the determination of suspicious input content subject matter at 106, some embodiments flag the content as suspicious (for example, generating a trouble object representing the transaction wherein a binary "suspicious content" attribute is toggled to "suspicious" from a default "unsuspicious" value).

At 108 the configured processor invokes or generates a negotiative chat bot component that presents a conversational chat bot message to the identified user that requests content subject matter in response that is different from the determined content of the suspicious request, by generating the presented chat message in a style or format that is chosen to be perceived as appropriate to a preferred conversational style of the identified user within user profile data 109 associated to the identified user. Embodiments may also generate the chat bot to communicate in a manner that the user is receptive to, as a function of matching to a preferred conversational style of the identified user for a business context of the determined content subject matter of the suspicious input. Thus, the chat bot message is thereby more likely to be perceived by the user as appropriate, and correspondingly more likely to elicit a response from the identified user, relative to generic or inappropriate chat bot messages generated by the prior art in a conversational style that is not preferred by, or acceptable to, the user.

Process at 108 requires time that inherently or necessarily extends the time frame relative to a conventional processing of the input at 102, wherein this extra time is available for use by the back-end security system to process the suspicious input received at 102, without any notification to or knowledge of the identified user that said processes are occurring. Thus, for a suspected transaction, the conventional path of the identified user of the input at 102 is delayed, by invoking and sending the user to a separate version of the service associated with the negotiative chat bot which is enabled to cause intentional delays, as well as collect additional context data (for example, the user network, source IP, device attributes, etc.) from responses thereto, via a series of questions or statements provided to the user at 108, each of which may generate content in response from the user.

Further, the more that the chat bot message aligns to the preferred conversational style of the user, the less that the user will become annoyed by the message, or the extra time needed to deal with the message by the user, enhancing user customer satisfaction with the overall experience while security is enhanced, in the background, by the back-end process, without the knowledge of the user.

At 110 the configured processor determines a value or amount that content of a response from the identified user to the chat message (likely) satisfies the requested subject matter. Embodiments may score the answer on a binary basis (yes or no or "one" or "zero"); or with a strength or scored value, for example, or 60% or 40% relevant or correct, etc.

At 112 the configured processor provides the determination value to the back-end security system in association with the response content, for use (as needed) by the back-end security system in resolving the suspicious input. In some embodiments the resolution considers (is a function of) the answer score determined at 110: for example, a lower score may increase an amount of suspiciousness of the input, and corresponding require additional verification or clearance procedures or values in order for the back-end security process to clear the input as safe or non-suspicious.

At 114 the configured processor prompts and receives feedback from the back-end security system as to whether the back-end security system has resolved the suspicious input, including as a function of the determination and content provided at 112; or that the back-end security system needs additional time, and/or information from response content to chat bot conversational questions, to resolve the suspicious input. Back end security systems may resolve suspicious inputs in a variety of ways, including verifying that identification tokens used to instigate multiple, frequent transactions are valid and not reported as missing or misplaced by the user; that transaction amounts match historical spending pattern and limits data for the user; that a log-in from an atypical device occurs is within typical geographic location data of the user; and still other examples will be appreciated by one skilled in the art. In some embodiments the back-end security system processes are incorporated within the chat bot application.

Thus, upon indication that the back-end security system has resolved the suspicious input, at 116 the chat terminates the current conversation with the identified user and instructs appropriate system agents to resume a transaction associated to the suspicious input at 102 through a normal path. Alternatively, the resolution at 116 may be a determination that the suspicious input is fraudulent activity, wherein the configured processor initiates action through an appropriate action interface platform to thwart any account take-over attempts, etc.

The configured processor also updates the user profile data 109 values at 116 with the results of the current session, wherein fraudulent activity confirmations or clearances at 116 and any behavior or behavior differences of the user relative to historical data of the user profile data 109 are logged for use in future iterations, and in some embodiment used to train user profile data values via machine learning processes. Thus, embodiments update or learn preferred conversational styles of the user by comparing the behavior of the user with past interactions, across channels, to thereby determine or revise values used for future interactions.

Otherwise, if more time and/or information is indicated as needed by the back-end security system to resolve the suspicious input at 114, the process returns to 108 to create and present another chat bot request to the identified user. Thus, the determination at 114 iteratively returns to 108 to engage the identified user in an on-going conversation having an appropriate style, until the back-end security system indicates that the suspicious input is resolved.

Aspects of the present invention improve security systems by either invoking or generating a chatbot that engages in an interactive conversation in order to introduces a time delay to allow the system to determine, assess and neutralize a security threat. Chatbot embodiments accomplish the creations of such delays by determining an appropriate context and communication method for generating engagement with and response from a suspicious user, replicating human behavior when encountering, or sensing, that an event or person is suspicious. People tend to gather more information to resolve their suspicions, but often in an unobtrusive or oblique manner from the subject of the suspicions. For example, a person who suspects some inappropriate behavior on the part of another person may engage that other person in an on-going conversation touching upon subjects wholly unrelated to a subject matter that forms the basis of the suspicion, in part to avoid offending the other person, and in part to avoid warning the other person of the suspicion, lest they become more guarded in their comments and behavior, and thereby make it harder for the first person to acquire more information or otherwise process information to resolve the suspicion.

Thus, embodiment chat bots generate conversational engagements that acquire relevant information directly, for example, dates and location of recent travel of a suspicious person to confirms or obviates a possibility that said other person may be physically located at a location of a suspicious transaction (a physical store or other location address, a server uniform resource locator (URL) address, etc.). By generating chat bot information requests that directly or indirectly touch upon the basis of the suspicion, embodiments avoid making the person aware of the suspicion, and they will accordingly tend to be more agreeable and amenable to extending the conversation to provide enough time and information to the back-end security system to understand and resolve a suspicious input and take or enable suitable actions directly or indirectly.

The conversational chat bot may take a number of approaches in generating conversational requests or responses to the identified user at 108. Embodiments may use a friendly, inoffensive, and colloquial manner to put the identified user at ease, or even entertain the user: for example, to include content selections or references to favorite content as indicated in the user profile data 109, such as artists, media content, genres of content, etc.

Embodiments may also intentionally respond in a non-integral manner, with content that is not directly related (is unrelated) relative to a previous request of response, causing the conversation time to extend, and also perhaps catching the identified user off-guard wherein some requests at 108 may be on-point to a subject matter that creates the suspicious nature of the suspicious input, wherein requests before and after are non-sequiturs, thereby lowering a risk of engendering suspicion in the identified user.

The chat bot may also extend processing time available for the back-end security system by not responding to the identified user, or by inserting long pauses between request and response activity.

Embodiments of the present invention provide methods and apparatuses that define the process of FIG. 4 within cognitive solutions that may be rendered via multiple interfaces including as provided by robotic devices, text-based user interface (UI) applications and voice-based interactive applications.

In the existing, prior art complex IT systems landscape, it is very difficult to detect suspicious or criminal activities, like the fraudulent attacks that take over a customer's account in a banking industry context, by relying upon direct input processing acquired through direct chat bot interrogation structures. Moreover, direct interrogation through a series of focused and direct questions to resolve a security issue as is common in the prior art may be perceived as inherently rude, accusatory and generally unacceptable to some users, particularly within a customer or client relationship to the identified user.

More particularly, one (a first) user may expect an indirect communication style in interpersonal communications, considering directly communicating negative or blunt information as impolite and crude, even in a business setting. Accordingly, in response to determining that the user profile data (109) of the first user indicates that the user prefers an indirect communication style, the chat bot conversation requests or statements provided to the user according to the present invention (including at 108, FIG. 4) comprise polite excuses or oblique or evasive content, even outright fictions or inaccurate or untruthful content, which the first user recognizes and expects as part of typical business or diplomatic conversation strategy, wherein problems or uncertainties are considered to be addressed and solved more productively when handled with tact and discretion.

In contrast, another (second), more task-oriented user may expect and prefer a direct communication style, where both literal truthfulness as well as efficiency in communication are more highly valued, and to some extent are a higher priority, for the second user relative to the first user, even where subject matters comprehend personal or political sensitivities (which the first user expects to address in an oblique or indirect fashion, especially in a business setting). The second user considers direct conversation to be more honest and respectful, since it is less open to wrong interpretation, less misleading, and less likely to lead to inefficient "game-playing," and generally feels that problems are solved more rapidly if open and frank discussion is encouraged. Thus, in response to determining that the user profile data (109) of the second user indicates that the user prefers a direct communication style, the chat bot conversation requests or statements provided to the user according to the present invention (including at 108, FIG. 4) that are accurate, more correct, terser, shorter and to-the-point, (for example, "No" or "I don't know"), relative to longer and more verbose and oblique outputs generated in conversation with the first user that expects and prefers an indirect style.

Financial institutions and other service providers put utmost priority on fraud preventions and continuously evolve their fraud management capabilities, but the proliferation of digital and "Internet of Things" (IoT) interface engagements lead to increasing opportunities to compromise system security. Accordingly, valid inputs from an identified user may be more easily associated with attributes that cause them to be considered suspicious. Resolving suspicious inputs efficiently, and without causing unpleasant interactions with client users, is generally difficult in the prior art, due to the resources required to continuously prevent, monitor, and investigate suspicious activities; lack of timely, actionable intelligence for enterprise-level command and control; and limited capabilities to predict the velocity and veracity of financial crime events.

In order to avoid alienating the client user, aspects of the present invention tailor negotiative chat bot interactions to meet the correct, expected direct or indirect style for that user, as a function of the user profile data, minimizing impacts on the client, by keeping the user engaged in a chat conversation that is appropriate to the user, while back-end service provide additional security processes to resolve a suspicious input from the user. Embodiments of the present invention leverage cognitive capabilities to monitor, stretch and continuously collect more user profile details during suspect client interactions, to thereby learn preferred conversational styles and content to be keep the user engaged for the time needed to resolve the suspicious input.

Some embodiments choose and apply integrity scrambler, conversation stretcher, and session response stretcher components to generate chat conversations with the identified user at 108 based on the user profile data values 109. The integrity scrambler component intentionally responds with differing queries on different subjects: for example, in response to a suspect question content of "How do I reach building number 3?", the integrity scrambler responds with a round-about, off-topic query, such as "What is the service that you require within Building 3?".

The session stretcher component intentionally responds slowly, to stretch-out an elapsed time of the engagement to create additional time for performing necessary actions in the background (to verify user credentials, etc.)

The conversation stretcher component creates additional, diversionary dialogue subject matter topics to raise in response to suspect inputs, to create additional time for performing necessary actions in the background. The diversionary dialogue topics are selected to match a previous topic as a natural, organic and completely casual subject matter extension that avoid ikes and dislikes or opinion-based dimensions to be perceived as innocuous, non-irritating and non-threatening. For example, in response to the suspect question of "How do I reach building number 3?", the conversational stretcher responds with "Hello Sir, welcome, how are you today? . . . I am very happy to help you. Can you let me know if you have earlier been here?".

Some embodiment define Cognitive Security Information Agent (CSIA) and Cognitive Security Interaction Controller (C SIC) components to receive suspicious events and intentionally extend conversational chat bot responses (through iteration at 108, FIG. 4) by extending the transaction time (for example, where the user is operating an automatic teller machine (ATM); responding with oblique and round-about conversations to reach a conversation destination (where the user profile data indicates that indirect communications are preferred or expected) route; intentionally extend the conversation; and obtain additional data that may trigger more granular log collection and forensic evidence consideration at the back-end, depending upon the need. In some embodiments the CSIC is integrated with a Security Information and Event Management Systems (SIEM), like "QRadar" or a "Suspect Event Listener" that listens to external and internal logs/feeds.

Embodiments may be configured to be working round the clock, or during certain parts of the day based on the preset configuration policy. For example, if based on history it is found that fraud transactions are high during a particular day or time, embodiments may be set to consider suspicious inputs during that specified time.

Embodiments may interact with agents deployed on all or select critical IT components of a solution. Some embodiments are plug in-based agents where each system can extend the base plug in to insert their system specific details, with respect to two elements: delaying the transactions, and collecting the additional information. When a suspicious activity is found, some embodiments instructs all agents, or only qualified agents, as per the policy specified to delay the current transaction.

Thus, embodiments generate and present conversational outputs (at 108, FIG. 4) to induce required delays, or content variations, in a given transaction. For example, where the suspicious input at 102 is a request for a withdrawal of money from a bank ATM, embodiments may generate additional queries requiring responses at 108 (for example, "Please confirm that you wish to execute a withdrawal, and not a cash advance"), in order to intentionally delay the transaction while the back-end service confirms that the card presented to the ATM has not be reported as lost or stolen.

Embodiments may also select a best channel of communication and interaction with the customer user at 108, for example, initiating text messaging in response to user preference data, or to cause further time delays, rather than communicating through the ATM screen. Some embodiments interact through a multi-channel integration manager component, where a multi-channel integration architecture is implemented.

Embodiments of the present invention provide further advantages over the prior art by enabling back-end threat detection and help with thwarting of hacking attempts, etc., leveraging cognitive decision engines by collecting more granular data by enabling lower-level logs, collecting more forensics data, etc. Some aspects receive responses from an action interface platform on the completion of actions, and thereby decide on normal restoration, wherein embodiments may also include a controller and an agent model that can be configured externally using rules or policies that define the duration and type of interaction with the user. Rules or policies can also be specified for controlling the behavior of the systems, as well as for collecting additional information for actionable security intelligence.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:
in response to determining that an input from an identified user is suspicious, executing a back-end security process to resolve a status of the suspicious input as safe or unsafe;
creating conversational chat bot message content that requests content subject matter in response that is different from content of the suspicious request;
generating a conversational chat bot message that comprises the created conversational chat bot message content in a style that matches a preferred conversational style of the identified user;
presenting the generated conversational chat bot message to the identified user; and
until determining that the status of the suspicious input is resolved, in response to each subsequent conversational chat bot message response from the identified user to a generated conversational chat bot message presented to the identified user, iteratively repeating the creating, generating and presenting conversational chat bot messages comprising requests for content subject matter in response that are different from each subsequent conversational chat bot message response and presented in the style that matches the preferred conversational style of the identified user.

2. The method of claim 1, further comprising:
creating the conversational chat bot message content subject matter to be unrelated to content of the suspicious request.

3. The method of claim 1, wherein the preferred conversational style of the identified user is selected from the group consisting of an indirect interpersonal communications style and a direct interpersonal communications style.

4. The method of claim 3, further comprising:
in response to determining that the preferred conversational style of the identified user is the indirect communication style, generating conversational chat bot message requests to comprise content that is chosen from the group consisting of oblique content, evasive content, fictional content, inaccurate content and untruthful content.

5. The method of claim 4, further comprising:
in response to determining that the preferred conversational style of the identified user is the direct communication style, generating conversational chat bot message requests to comprise content that is, relative to the message content generated in response to determining that the preferred conversational style of the identified user is the indirect communication style, terser more accurate or more truthful.

6. The method of claim 1, further comprising:
determining that the status of the suspicious input is resolved as a function of content associated to a response from the identified user that is selected from the group consisting of a physical location address and a server uniform resource locator address.

7. The method of claim 1, further comprising:
selecting the generating conversational chat bot message request content subject matter to include a reference to favorite content item indicated in the user profile data.

8. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer readable storage medium via the computer readable memory and thereby performs the executing the back-end security process to resolve the status of the suspicious input, the creating the conversational chat bot message content, the generating the conversational chat bot message, the presenting the generated conversational chat bot message to the identified user, and the iteratively repeating the creating, generating and presenting the conversational chat bot messages in the style that matches the preferred conversational style of the identified user.

9. The method of claim 8, wherein the computer-readable program code is provided as a service in a cloud environment.

10. A computer system, comprising:
a computer processor;
a computer readable memory in circuit communication with the computer processor; and
a computer readable storage medium in circuit communication with the computer processor;
wherein the computer processor executes program instructions stored on the computer readable storage medium via the computer readable memory and thereby:
in response to determining that an input from an identified user is suspicious, executes a back-end security process to resolve a status of the suspicious input as safe or unsafe;
creates conversational chat bot message content that requests content subject matter in response that is different from content of the suspicious request;
generates a conversational chat bot message that comprises the created conversational chat bot message content in a style that matches a preferred conversational style of the identified user;
presents the generated conversational chat bot message to the identified user; and
until determining that the status of the suspicious input is resolved, in response to each subsequent conversational chat bot message response from the identified user, iteratively repeats creating, generating and presenting conversational chat bot messages comprising requests for content subject matter in response that are different from each subsequent conversational chat bot message response and presented in the style that matches the preferred conversational style of the identified user.

11. The system of claim 10, wherein the processor executes program instructions stored on the computer readable storage medium via the computer readable memory and thereby:
creates the conversational chat bot message content subject matter to be unrelated to content of the suspicious request.

12. The system of claim 10, wherein the preferred conversational style of the identified user is selected from the group consisting of an indirect interpersonal communications style and a direct interpersonal communications style.

13. The system of claim 12, wherein the processor executes program instructions stored on the computer readable storage medium via the computer readable memory and thereby:
in response to determining that the preferred conversational style of the identified user is the indirect communication style, generates conversational chat bot message requests to comprise content that is chosen from the group consisting of oblique content, evasive content, fictional content, inaccurate content and untruthful content.

14. The system of claim 13, wherein the processor executes program instructions stored on the computer readable storage medium via the computer readable memory and thereby:
in response to determining that the preferred conversational style of the identified user is the direct communication style, generates conversational chat bot message requests to comprise content that is, relative to the message content generated in response to determining that the preferred conversational style of the identified user is the indirect communication style, terser more accurate or more truthful.

15. The system of claim 10, wherein the processor executes program instructions stored on the computer readable storage medium via the computer readable memory and thereby:
determines that the status of the suspicious input is resolved as a function of content associated to a response from the identified user that is selected from the group consisting of a physical location address and a server uniform resource locator address.

16. A computer program product, comprising:
a computer readable storage medium having computer readable program code embodied therewith, the computer readable program code comprising instructions for execution by a computer processor that causes the computer processor to:
in response to determining that an input from an identified user is suspicious, execute a back-end security process to resolve a status of the suspicious input as safe or unsafe;
create conversational chat bot message content that requests content subject matter in response that is different from content of the suspicious request;
generate a conversational chat bot message that comprises the created conversational chat bot message content in a style that matches a preferred conversational style of the identified user;
present the generated conversational chat bot message to the identified user; and
until determining that the status of the suspicious input is resolved, in response to each subsequent conversational chat bot message response from the identified user, iteratively repeat creating, generating and presenting conversational chat bot messages comprising requests for content subject matter in response that are different from each subsequent conversational chat bot message response and presented in the style that matches the preferred conversational style the identified user.

17. The computer program product of claim 16, wherein the instructions for execution cause the computer processor to:
create the conversational chat bot message content subject matter to be unrelated to content of the suspicious request.

18. The computer program product of claim 16, wherein the preferred conversational style of the identified user is selected from the group consisting of an indirect interpersonal communications style and a direct interpersonal communications style.

19. The computer program product of claim 18, wherein the instructions for execution cause the computer processor to:
in response to determining that the preferred conversational style of the identified user is the indirect communication style, generate conversational chat bot message requests to comprise content that is chosen from the group consisting of oblique content, evasive content, fictional content, inaccurate content and untruthful content.

20. The computer program product of claim 19, wherein the instructions for execution cause the computer processor to:
in response to determining that the preferred conversational style of the identified user is the direct communication style, generate conversational chat bot message requests to comprise content that is, relative to the message content generated in response to determining that the preferred conversational style of the identified user is the indirect communication style, terser more accurate or more truthful.

* * * * *